United States Patent [19]

Bignell

[11] 4,371,907

[45] Feb. 1, 1983

[54] PROTECTIVE RELAY APPARATUS AND METHODS FOR PROTECTING ELECTRICAL POWER TRANSMISSION LINES

[75] Inventor: Allan M. Bignell, Mississauga, Canada

[73] Assignee: Westinghouse Canada Inc., Hamilton, Canada

[21] Appl. No.: 291,745

[22] Filed: Aug. 11, 1981

[51] Int. Cl.³ .............................................. H02H 3/40
[52] U.S. Cl. ..................................... 361/82; 361/79; 361/84
[58] Field of Search ..................... 361/79, 80, 81, 82, 361/84; 324/51, 52

[56] References Cited

U.S. PATENT DOCUMENTS

| | | | |
|---|---|---|---|
| 3,474,333 | 10/1969 | Hoel | 361/80 X |
| 3,700,919 | 10/1972 | Stich | 361/82 X |
| 4,287,547 | 9/1981 | Vitins | 361/82 |
| 4,297,740 | 10/1981 | Hagberg | 361/84 X |
| 4,351,011 | 9/1982 | Liberman | 361/82 |

Primary Examiner—Harry E. Moose, Jr.
Attorney, Agent, or Firm—D. R. Lackey

[57] ABSTRACT

Protective relay apparatus and methods for detecting direction to a fault from a measuring point on an A.C. electrical power transmission line using current and voltage deviation signals which may include traveling wave transients, and for providing both directional and distance information from the same signals after traveling wave transients have been removed. Fault generated current and voltage deviations from the steady-state, prefault magnitudes are used to generate trajectories in one embodiment by differentiating the current deviation and using it as one coordinate, and by using the voltage deviation as the other coordinate. A forward fault produces a straight line trajectory which crosses the origin between the second and fourth quadrants, and the reverse direction fault produces a straight line trajectory which crosses the origin between the first and third quadrants. Providing threshold boundaries in the quadrants and detecting a crossing thereof provides fault direction according to the quadrant in which the crossing occurred.

36 Claims, 10 Drawing Figures

PROTECTIVE RELAY APPARATUS AND METHODS FOR PROTECTING ELECTRICAL POWER TRANSMISSION LINES

BACKGROUND OF THE INVENTION

1. Field of the Invention

The invention relates to protective relay apparatus and methods for protecting A.C. electrical power transmission lines.

2. Description of the Prior Art

Conventional distance relaying for protecting three-phase electrical power transmission lines detects line impedance changes at power frequency, i.e., 50 or 60 Hz. The filtering necessary to filter out fault transients limits the reaction time of this approach. Since increasing the speed of fault detection and the clearing of the fault improves system stability, it has been proposed that the initial changes in line voltage and line current caused by incident traveling waves generated by a fault be used to detect and clear faults faster than possible by using power frequency measurements.

One prior art approach using traveling waves plots the trajectory of the fault generated voltage and current deviations as a function of time on a deviation plane, with the voltage deviation being on the X-axis and the current deviation on the Y-axis. The trajectory of such a plot is made up of two components. The first component, which is responsive to the power frequency signals, defines an elliptical orbit, with CW rotation indicating a fault in the forward direction, and CCW rotation indicating a fault in the reverse direction. The second component, which is responsive to traveling wave activity, causes the underlying elliptical orbit to be distorted by a high frequency component which is not elliptical. By setting up suitable boundary thresholds in each quadrant, the direction of a fault relative to the relaying point may be determined by detecting the first boundary crossed by a fault generated trajectory. The trajectory starts from the X-axis. Thus, if the first boundary crossed is in the second or fourth quadrants, the orbit is CW and the fault is in the direction of the protected line, i.e., a forward fault. If the first boundary crossed is in the first or third quadrants, the orbit is CCW and the fault is a reverse direction fault. While this technique enables very quick directional determination, it possesses some practical problems which make it difficult to apply. For example, in order to prevent the generation of high frequency transients in a non-faulted phase due to mutual coupling with a faulted phase, as well as to minimize the effects of lightning impulses and high frequency transients caused by close-in faults, the deviation signals must be passed through a low pass filter having a cut-off of about 1 KHz. This filtering can reduce the initial magnitude of the trajectory such that it misses the boundary threshold in the entry quadrant, and it then crosses the boundary threshold in the next quadrant. When this happens, the detection indicates that the fault is in the opposite direction from its actual location. Also, since the elliptical trajectory crosses both forward and reverse boundary thresholds, it is not only essential that the trajectory cross a boundary in the entry quadrant, but it is also important that the first boundary crossing be latched or memorized, and subsequent boundary crossings be ignored. Thus, when multiple faults occur, such as during a lightning storm, it would be possible to recognize a fault in the reverse direction, latch it, block subsequent recognitions, and miss a closely following fault in the forward direction.

The power frequency voltage and current deviations, in addition to producing an elliptical orbit which indicates direction to the fault, also contain sufficient information relative to distance from the fault to enable a direct or zone 1 trip decision. The boundaries are set such that if the trajectory crosses a forward boundary it is known that the fault is within the protected zone. This zone 1 trip decision, however, is complicated by the fact that the position and shape of the elliptical component of the orbit is responsive to both the fault inception angle $\gamma$ and the source impedance. Thus, it is extremely difficult to set the boundary threshold for a direct trip. Also, the traveling wave transients cause an overreach beyond the intended zone of protection. Filtering to remove this overreaching effect can produce incorrect operation, as hereinbefore stated.

SUMMARY OF THE INVENTION

Briefly, the present invention solves the practical problems associated with the elliptical trajectory concept by differentiating the current deviation signal and using this differentiated signal as the Y-axis coordinate. Alternatively, the voltage deviation signal may be integrated. Instead of an ellipse having a rotational direction responsive to fault direction, a forward fault produces a straight line trajectory on this transformed deviation plane which crosses the origin between the second and fourth quandrants, and a reverse direction fault produces a straight line trajectory which crosses the origin between the first and third quadrants. If the protective relaying application only requires the detection of forward faults, boundary thresholds are established in the second and fourth quadrants. The crossing of either boundary threshold, which will occur at least four times in one power cycle, indicates a forward fault. If the protective relaying application also requires the detection of reverse direction faults, in order to add security to the system by sending blocking signals to an appropriate relay, boundary thresholds are also established in the first and third quadrants. Thus, forward faults cross only forward boundaries, and reverse faults cross only reverse boundaries. It is not possible to obtain incorrect directional information when using the transformed deviation plane.

The disclosed invention also eliminates the problem associated with multiple faults, as a forward direction fault which closely follows a reverse direction fault will be recognized as such.

The present invention also simplifies the use of the concept for making independent or zone 1 trip decisions when the traveling wave response is filtered or removed from the deviation signals. Unlike the elliptical orbit, whose position and shape is dependent upon the fault initiation angle $\gamma$ and the source impedance $X_s$, the straight line trajectories are unaffected by fault initiation angle. Only the slope of the straight line trajectory changes with source impedance. Thus, the boundary thresholds for detecting a zone 1 fault need not be set for the "worst case", i.e., to accommodate the full range of possible $X_s$ and $\gamma$ values, as would be required by the prior art elliptical trajectory approach. Thus, the reach of a protective relay constructed according to the teachings of the present invention may be set for a much greater percentage of the protected line, and it will thus detect and clear more zone 1 faults than would a system using the elliptical orbit concept.

BRIEF DESCRIPTION OF THE DRAWING

The invention may be better understood, and further advantages and uses thereof more readily apparent, when considered in view of the following detail description of exemplary embodiments, taken with the accompanying drawings in which.

DESCRIPTION OF PREFERRED EMBODIMENTS

Figure 1:
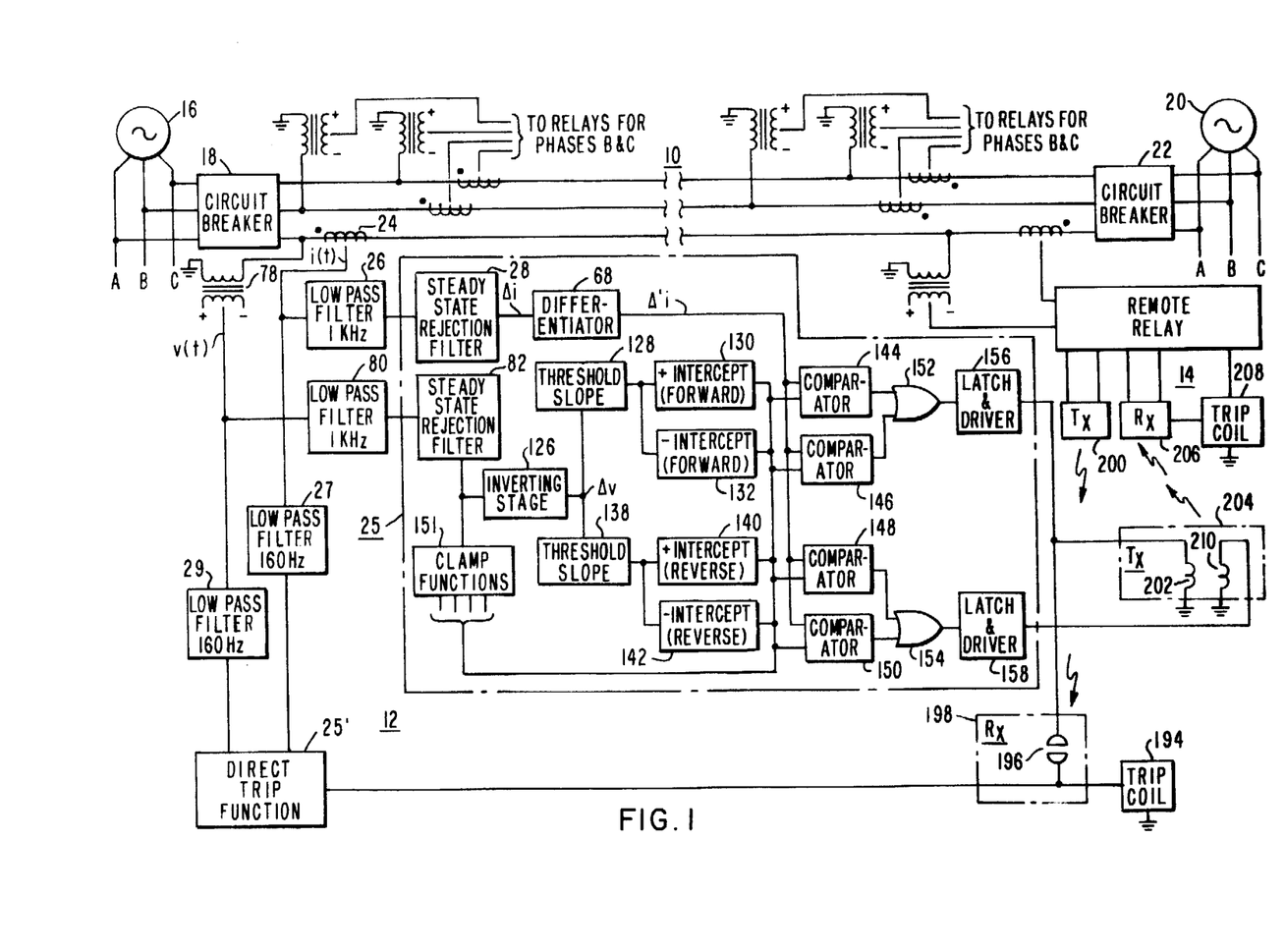
FIG. 1 is a partially schematic and partially block diagram of a protective relaying system for protecting an A.C. polyphase transmission line, which system is constructed according to the teachings and methods of the invention.

Referring now to the drawings, and to FIG. 1 in particular, there is shown a three-phase A.C. electrical power transmission line system 10 which is protected by local and remote protective relay apparatus 12 and 14, respectively, constructed according to the teachings of the invention. The new methods and apparatus of the invention are illustrated by way of example by disclosing them relative to their use in relays 12 and 14, but it is to be understood that the new apparatus and methods may be used as elements of many different protective relay arrangements.

Since the local and remote relays 12 and 14 may be of similar construction, only the local relay 12 is shown in detail. Also, in the exemplary embodiment, each phase of the three-phase system 10 is monitored for faults by similar relays, and thus only the relay for phase A of the local relay 12 is shown in detail.

More specifically, transmission line 10 includes a first source 16 of three-phase A.C. electrical power having a power frequency such as 50 Hz or 60 Hz, which is connected to transmission line 10 via a local circuit breaker 18. The remote end of transmission line 10 may be connected to a second source 20 of three-phase A.C. electrical power via a remote circuit breaker 22. Relays 12 and 14 are ultra high speed directional relays which make a determination of fault direction within the first power cycle via the information in fault generated traveling waves. The directional element of relay 12 is shown within broken outline 25. If relays 12 and 14 each detect a fault in the forward direction, i.e., in the direction of the protected line 10, they each send a signal to the other relay via microwave, power line carrier, telephone, or any other suitable communication link, to close a contact, or otherwise enable, a circuit breaker trip circuit which permits the associated relay to trip its associated circuit breaker. Thus, the directional aspect is permissive, permitting a trip when a relay detects a fault in the forward direction only when the associated remote relay has also detected a fault in the direction of the protected transmission line section.

Relays 12 and 14 are also distance relays, capable of making direct or zone 1 fault decisions when the communication channel fails, or when the channel is slow and a relay makes the zone 1 trip decision faster than the channel delay time. The same principles which generated the directional indication from the traveling wave information will also generate directional and distance information using the voltage and current deviations from the steady state, which deviations have been filtered to be substantially free from high frequency transients. The direct trip function is shown generally at 25', and is given the same reference numeral as the directional element because it may be the same. The additional filtering required to filter the traveling wave activity from the power frequency components is shown at 27 and 29. Filters 27 and 29 are low pass filters having a cut-off frequency of 160 Hz, or lower. Since the direct trip function within block 25' may be the same as the directional comparison function, with appropriately set threshold boundaries for each, only the apparatus within block 25 will be described in detail.

Relay 12, which protects phase A of the three-phase transmission line 10, includes means for deriving a signal $\Delta i$ which is a function of the fault generated current deviation from the steady state pre-fault alternating current as a function of time. This "means" for function 25 may include a current transformer 24, a first order low pass filter 26 having a cut-off frequency of about 1 KHz, and a steady state rejection filter 28. As illustrated in detail in FIG. 2, the signal i(t) produced by the current transformer 24 associated with phase A may be applied to an isolating transformer 30, the output of which is applied across a resistor 32. Thus, the voltage across resistor 32 is a function of the current in phase A, and it is applied to the input of the low pass filter 26.

The low pass filter 26 is necessary in order to prevent false operation due to high frequency transients which may be induced into an unfaulted phase from a faulted phase due to mutual coupling. Filter 26 reduces these transients, and it also reduces transients due to lightning and close-in faults. In the prior art elliptical trajectory concept, this filter may cause a false direction indication because it also attenuates the leading edge of the traveling wave voltage and current deviations, causing the trajectory to miss the threshold boundary in the entry quadrant. Thus, in the prior art elliptical trajectory concept, the design of this filter is critical, and certain tradeoffs are necessary in order to achieve correct operation with the elliptical trajectory concept. This criticality is removed by the teachings of the present invention, as will be hereinafter more fully explained.

Figure 2:
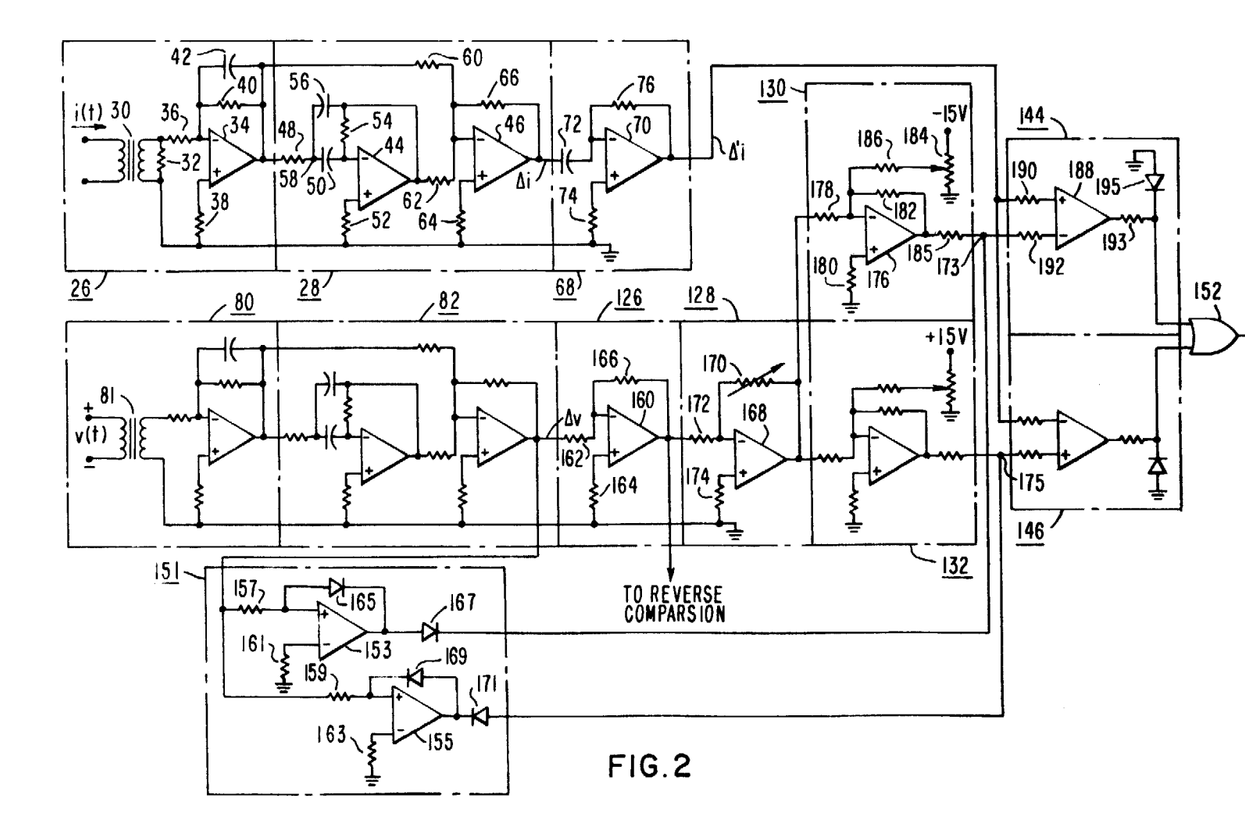
FIG. 2 is a schematic diagram which illustrates exemplary circuits which may be used to develop certain of the functions shown in block form in FIG. 1.

As shown in FIG. 2, filter 26 may include an operational amplifier (op amp) 34 having an input resistor 36 connected from the output of current transformer 30 to the inverting input of op amp 34. The non-inverting input is connected to ground via a resistor 38, and the feedback network from the output to the inverting input includes parallel connected resistor 40 and capacitor 42.

The steady state rejection filter 28 may be constructed using first and second op amps 44 and 46, respectively, with the first op amp 44 being connected to function as a high Q bandpass filter which functions as a "memory" in order to provide a measurement of the pre-fault steady state current. The output of filter 26 is applied to the inverting input of op amp 34 via a resistor 48 and a capacitor 50. The non-inverting input is connected to ground via a resistor 52. Feedback from the output of op amp 44 to its inverting input is provided via a resistor 54, and a capacitor 56 is connected from the output to the junction 58 between resistor 48 and capacitor 50.

Op amp 46 is connected as a summing amplifier, which sums the outputs of op amps 34 and 44 via input resistors 60 and 62, respectively, applied to its inverting input. A resistor 64 connects the non-inverting input to ground, and feedback from the output to the inverting input is provided by resistor 66. Since op amp 44 inverts the polarity of the output of op amp 34, op amp 46 provides an output $\Delta i$ which is responsive to the output of op amp 34 minus the output of op amp 46, and thus signal $\Delta i$ is a function of the fault induced current deviation from the pre-fault steady state current, and as such it includes the traveling wave transient.

According to the teachings of the invention, the current deviation signal $\Delta i$ is differentiated by a differentiator 68, to provide a signal $\Delta'i$. As shown in FIG. 2, the differentiation function 68 may be provided by an appropriately connected op amp 70. The output $\Delta i$ of op amp 46 is applied to the inverting input of op amp 70 via a capacitor 72, the non-inverting input is connected to ground via a resistor 74, and negative feedback from the output to the inverting input is provided by a resistor 76.

Relay 12 also includes means for deriving a signal $\Delta v$, which is a function of the fault generated voltage deviation from the steady state pre-fault alternating voltage as a function of time. This "means" may include a potential transformer 78, a first order low pass filter 80 having a cut-off frequency of about 1 KHz, and a steady state rejection filter 82. As shown in FIG. 2, the signal v(t) developed by potential transformer 78 may be applied to filter 80 via an isolating transformer 81. Since filters 80 and 82 may be constructed similar to filters 26 and 28, respectively, it is not necessary to describe them in detail.

Instead of differentiating the current deviation signal $\Delta i$, it would be equally suitable to integrate the voltage deviation signal $\Delta v$. In other words, the requirement is that at least one of the signals be transformed such that the order of differentiation of the current signal $\Delta i$ is one higher than voltage signal $\Delta v$, with differentiation considered as being the inverse of integration. As a practical matter, only one of the signals will be transformed, i.e., the current signal $\Delta i$ will be differentiated, or the voltage signal $\Delta v$ will be integrated. However, the current signal used may be the second derivative of $\Delta i$ and the voltage signal used may be the first derivative of $\Delta v$; or, the current signal used may be the first integral of $\Delta i$ and the voltage signal used may be the second integral of $\Delta v$. For purposes of example, the invention will be described using the differential of the current signal $\Delta i$.

Figure 3:
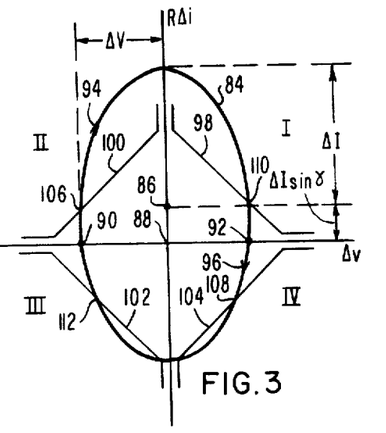
FIG. 3 is a graph of the deviation plane which provides an elliptical trajectory when plotting the fault initiated power frequency current and voltage deviations from the pre-fault condition.

In the prior art elliptical trajectory theory, a trajectory is developed using the fault induced current and voltage deviations $\Delta i$ and $\Delta v$ by plotting $\Delta v$ on the abscissa or X-axis and $\Delta i$, scaled by a factor R, on the ordinate or Y-axis, using plane, rectangular Cartesian coordinates. As shown in FIG. 3, the trajectory of the power frequency signals in this deviation plane defines an ellipse 84 whose center 86 relative to the origin 88 is dependent upon the fault inception angle $\gamma$. The superimposed high frequency component is not shown in FIG. 3, or in the remaining Figures which illustrate the elliptical trajectory. Thus, while the Figures illustrate a perfectly formed ellipse, it should be remembered that the actual trajectory is substantially elliptical, with the high frequency component due to traveling ware activity distorting the trajectory as it follows a generally elliptical path. If the fault occurs at maximum voltage, the center 86 and origin coincide. If the fault occurs at a voltage zero, the ellipse passes through the origin and is either above, or below, the X-axis, depending upon the fault initiation angle. If the fault inception angle falls between maximum voltage and voltage zero, the offset is proportional to sin $\gamma$.

At time t=0, the trajectory is at the origin 88. When the fault occurs, it immediately jumps along the X-axis, since the current cannot change instantaneously, to point 90, or point 92, depending upon the fault initiation angle. If the fault is a forward direction fault, the trajectory is CW, and it enters quadrant II from point 90, or quadrant IV from point 92, is indicated by arrowheads 94 and 96, respectively.

If the fault is in the opposite direction from the measuring point, i.e., a reverse direction fault, the trajectory is CCW, entering quadrant III from point 90 or quadrant I from point 92. One complete revolution of the elliptical orbit 84 indicates one cycle of power frequency, i.e., 16.67 msec. By establishing boundary thresholds 98, 100, 102 and 104 in quadrants I, II, III, and IV, respectively, and detecting the first crossing of a boundary by the elliptical trajectory 84 with the superimposed high frequency component, it is possible to quickly, i.e., within less than about 4 msec, to determine direction to the fault. If threshold boundary 100, or threshold boundary 104, is first crossed, at point 106 or 108, respectively, the fault is in the forward direction, and if threshold boundary 98, or threshold boundary 102, is first crossed, at points 110 or 112, respectively, the fault is in the reverse direction.

Problems arise in applying this concept due to the low pass filters 26 and 80, which may attenuate the traveling wave current and voltage deviations sufficiently during the first few msec such that the orbit 84 misses the boundary in the entry quadrant, but it crosses the boundary in the next or subsequent quadrant. If this occurs, the intelligence derived indicates the fault is in the opposite direction from its actual direction. Depending upon the type and location of the fault, there is a possibility of missing the first crossing regardless of where the thresholds are placed. Also, setting the boundaries closer to the origin in an attempt to "catch" the initial orbit in the entry quadrant may result in false tripping due to lightning and/or switching transients, as well as induced transients from a faulted phase. Thus, trade-offs between sensitivity and filtering must be made, which make it difficult to correctly determine the position of the threshold boundaries.

Also, assume that the trajectory 84 correctly crosses the boundary 102 in quadrant III, indicating a reverse direction fault. The orbit will also cross the forward boundaries. Thus, the first crossing must be latched and subsequent crossings ignored for a predetermined period of time. If a forward direction fault should occur during this predetermined period of time, it will be missed.

Figure 4A:
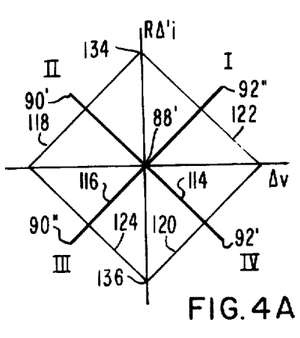
FIG. 4A is a graph of the transformed deviation plane which provides straight line trajectories for forward and reverse direction faults, using the power frequency voltage deviation, and the differential of the fault induced power frequency current change as the coordinates.
Figure 4B:
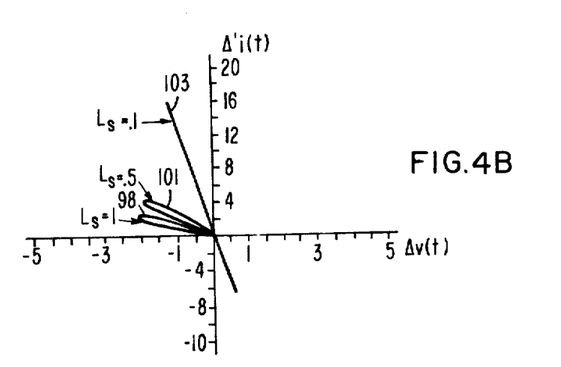
FIG. 4B is a graph of the transformed deviation plane which illustrates the trajectories for forward direction faults, using different source inductances, for deviation signals which include traveling wave transients.

These problems associated with the elliptical orbit concept are eliminated by the present invention, which differentiates the current deviation signal $\Delta i$ to provide a signal $\Delta' i$. Signal $\Delta' i$ is used on the Y-axis instead of $\Delta i$. As shown in FIG. 4A, the elliptical orbit 84, when rotating CW, is transformed into a straight line trajectory 114 which crosses the origin 88' between quadrants II and IV. When the elliptical orbit 84 is rotating CCW, it is transformed into a straight line trajectory 116 which crosses the origin 88' between quadrants I and III. Point 90 in FIG. 3 transforms into points 90' or 90" in FIG. 4A, depending upon fault direction, and point 92 in FIG. 3 transforms into points 92' or 92" in FIG. 4A, depending upon fault direction. Since the ellipse shown in FIG. 3 is offset from the origin, the points 90', 90", 92' and 92" are less than the maximum voltage $\Delta v$. The Y-axis crossings in FIG. 3 transform into the origin in FIG. 4A. While FIG. 4A plots the power frequency deviations, FIG. 4B illustrates that the trajectory is substantially a straight line on the transformed deviation plane when the high frequency components due to traveling wave activity are superimposed on the power frequency components. Curves 99, 101 and 103 in FIG. 4B illustrate the trajectories with a fault inception angle $\gamma$ of 0 degrees, and source per unit inductances $L_s$ of 1, 0.5 and 0.1, respectively. Thus, if it is desired to only detect a forward direction fault, threshold boundaries 118 and 120 may be established in quadrants II and IV, respectively. If a forward fault occurs, the orbit on the transformed deviation plane jumps from the origin 88' to a point on the straight line trajectory determined by the fault inception angle $\gamma$, and then, during one power frequency cycle, it proceeds to the end of the trajectory in a direction determined by the fault inception angle $\gamma$, it reverses and proceeds to the end in the opposite direction, and it then returns to its starting point on the trajectory. It thus may cross a forward direction boundary up to four times in one power cycle. High frequency traveling wave transients may cause the boundary to be crossed more than four times during one power cycle. If it is also desirable to detect reverse direction faults, threshold boundaries 122 and 124 may be established in quadrants I and III respectively. If a reverse direction fault occurs, the trajectory will jump to a point on line 116 determined by the fault inception angle $\gamma$, and proceed as described relative to the forward fault on line 114. Thus, forward faults only cross forward boundaries, and reverse faults only cross reverse boundaries. There is no possibility of erroneous direction information. If a reverse fault is detected, it is unnecessary to block subsequent threshold boundary crossing recognitions. Therefore, if a forward fault closely follows a reverse fault, it will generate its own separate trajectory and the forward fault will be detected. As hereinbefore stated, the position of the straight line orbits 114 and 116 in the transformed deviation plane shown in FIG. 4 are unaffected by the fault inception angle. The source inductance $L_s$ controls the slope of the straight line orbit, as shown in FIG. 4B.

FIG. 1 illustrates in block form an arrangement for establishing threshold boundaries 118, 120, 122 and 124, and for detecting the crossing thereof, and FIG. 2 illustrates circuits which may be used to implement these functions. Generally, the approach used for purposes of example is to establish each threshold boundary by selecting its slope and one axis intercept point. Care should be taken to insure a boundary in one quadrant does not cross into another quadrant, as this could cause misoperation. Then, the instantaneous value of $\Delta v$ and each threshold boundary are used to develop the maximum value of signal $\Delta' i$ which will describe a point on the trajectory. In other words, the present value of $\Delta v$ forms one coordinate. A vertical line from the X-axis to this coordinate strikes the associated threshold boundary. A horizontal line from this intersection to the Y-axis establishes the value of $\Delta' i$ for the present value of $\Delta v$ which results in a point on the boundary threshold. Thus, this coordinate for $\Delta' i$ may be used as a threshold signal for comparison with the actual value of signal $\Delta' i$.

Since signal $\Delta' i$ was subjected to one additional polarity inverting stage by differentiator 68, signal $\Delta v$ is applied to an inverting stage 126 to preserve their original relative polarity relationship. The slope of the forward threshold boundaries 118 and 120 is selected at 128, and the output of the threshold slope selector 128 is applied to stages 130 and 132. Stages 130 and 132 include means for selecting the positive and negative Y-axis intercepts 134 and 136, respectively, for threshold boundaries 118 and 120, respectively, and the stages determine and output the maximum value for $\Delta' i$ for the specific $\Delta v$ input. If the protective relay system also requires that reverse direction faults be recognized, the output of inverting stage 126 may also be connected to threshold slope selector 138 which selects the slope of the reverse direction threshold boundaries 122 and 124. The output of slope selector 138 is applied to stages 140 and 142 which select the positive and negative Y-axis intercepts, which are illustrated in FIG. 4 as being the same as for the forward threshold boundaries, but they need not be, and these stages develop and output the maximum value for $\Delta' i$ for the specific $\Delta v$ input. Thus, the outputs of stages 130, 132, 140 and 142 are $\Delta' i$ threshold signals for the threshold boundaries in quadrants II, IV, I and III, respectively. Suitable clamping for preventing the threshold boundaries from extending into adjacent quadrants is shown generally at 151.

The outputs of stages 130, 132, 140 and 142 are applied to inputs of comparators 144, 146, 148 and 150, respectively, and signal $\Delta' i$ from differentiator 68 is applied to the remaining inputs of these comparators. If signal $\Delta' i$ reaches the level of any threshold input, the output of the associated comparator goes high, i.e., to a logic one. The outputs of comparators 144 and 146 are applied to the inputs of an OR gate 152, and the outputs of comparators 148 and 150 are applied to inputs of OR gate 154. The outputs of OR gates 152 and 154 are applied to latch and driver circuits 156 and 158, respectively. Thus, if the output of comparator 144, or the output of comparator 146, goes high to signify a forward direction fault, the output of OR gate 152 will go high to set latch 156. In like manner, if the output of comparator 148, or the output of comparator 150, goes high to signify a fault in the reverse direction, the output of OR gate 154 will go high to set latch 158.

FIG. 2 illustrates operational amplifier arrangements which may be used to perform the functions shown in block form in FIG. 1, related to the development of the Δ'i threshold signals from the Δv input and the threshold boundaries. For example, the inverting stage 126 for Δv may include an op amp 160 connected to invert the polarity of the signal Δv applied to its inverting input via a resistor 162. The non-inverting input is connected to ground via resistor 164, and a feedback resistor 166 connects the output back to the inverting input.

Figure 2A:
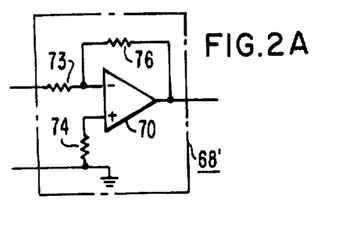
FIGS. 2A and 2B illustrate modifications which may be made to FIG. 2, to implement another embodiment of the invention.
Figure 2B:
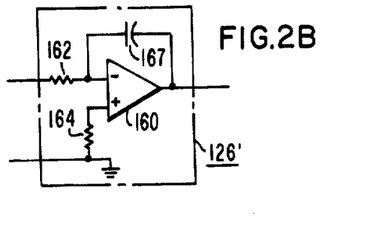

If it is desired to provide the different order current and voltage derived signals by integrating the voltage signal Δv instead of differentiating the current signal Δi, it would only be necessary to convert the differentiating stage 68 to a polarity inverting stage by replacing capacitor 72 with a resistor, and to convert the inverting stage 126 to an integrating stage by replacing resistor 166 with a capacitor. FIG. 2A illustrates the change to stage 68 by adding resistor 73, and FIG. 2B illustrates the change to stage 126 by adding capacitor 167.

The threshold slope selector may be provided by an op amp 168 connected as an inverting amplifier, with an adjustable resistor 170 in its feedback circuit to select the slope. The output of the inverting stage 126 is applied to the inverting input of op amp 168 via a resistor 172, and its non-inverting input is connected to ground via a resistor 174.

Stage 130 for selecting the positive Y-axis intercept 134 of the threshold boundary 118, and for outputting the Δ'i coordinate, which, with the present Δv coordinate describes a point on boundary 118, may include an op amp 176. A resistor 178 couples the output of slope selector 128 to its inverting input, and its non-inverting input is connected to ground via a resistor 180. A feedback resistor 182 connects the output to its inverting input, and the positive Y-axis intercept is selected by a negative 15 volt source of unidirectional potential, an adjustable resistor 184, and a resistor 186. The negative source is connected to ground via adjustable resistor 184, and the selector arm of resistor 184 is connected to the inverting input of op amp 176 via resistor 186. A resistor 185 connects the output of op amp 176 to the next stage.

The clamping functions 151 for the forward threshold boundaries in quadrants II and IV may be provided by a pair of op amps 153 and 155, with signal Δv being applied to their non-inverting inputs via resistors 157 and 159, respectively. The inverting inputs of op amps 153 and 155 are connected to ground via resistors 161 and 163, respectively. A diode 165 is connected between the non-inverting input of op amp 153 to its output, with its anode connected to the non-inverting input; and, a diode 167 connects the output of op amp 153 to the output of the forward intercept function 130 at junction 173, with the anode of diode 167 being connected to the output of op amp 153. A diode 169 is connected from the output of op amp 155 to its non-inverting input, with its anode being connected to its output; and, a diode 171 connects the output of op amp 155 to the output of forward intercept function 132 at junction 175, with the cathode of diode 171 being connected to the output of op amp 155.

The operation of op amp 153 in preventing the threshold boundary in the second quadrant from entering the first and third quadrants, will now be described. When Δv is less than 0, diode 165 clamps the output of op amp 153 at 0 volt. If junction 173 attempts to go negative, it will be clamped by diode 167, and prevented from entering the third quadrant. The resistor 185 in function 130 limits the current during clamping. If signal Δv is greater than 0 volt, the output of op amp 153 will be +15 volts and junction 173 will be forced to the ceiling voltage so that it will not enter quadrant I. A similar description, changing the polarities where necessary, will illustrate how op amp 155 prevents the boundary in the fourth quadrant from entering the first and third quadrants.

Comparator 144 may be implemented by an op amp 188, with signal Δ'i being coupled to its inverting input via a resistor 190, and the Δ'i threshold coordinate for stage 130 is applied to its non-inverting input via a resistor 192. The output of op amp 188 is prevented from going negative by a resistor 193 and a diode 195.

Stage 132 may be the same as stage 130, except a positive 15 volt source is used to set the negative Y-axis intercept. Comparator 146 may be of the same construction as comparator 144.

The output of latch and driver 156 may be connected to a circuit breaker trip coil 194 via a n.o. contact 196 which may be associated with a receiver 198. If circuit breaker 118 is a three-phase breaker, or three single-phase breakers which are to be tripped simultaneously, trip coil 194 would be arranged to trip all three phases. If circuit breaker 18 is in the form of three single-phase breakers, trip coil 194 may be arranged to trip only the phase A breaker, if single pole tripping with high speed reclosing is utilized.

If the relay system is of the permissive type, as illustrated, the receiver 198 is in communication with a transmitter 200 associated with the remote relay 14 via the selected communication link, such as microwave. If remote relay 14 detects a fault in the protected line 10 it transmits an appropriate signal to relay 12 via transmitter 200. When this signal is received by receiver 198, it closes its contact 196. Thus, if contact 196 is closed while latch and driver 156 is providing a trip signal, trip coil 194 may be energized to trip phase A, or all three phases of circuit breaker 18.

The trip signal provided by latch and driver 156 is also applied to a keying coil 202 of a transmitter 204. Transmitter 204 transmits an appropriate signal to remote relay 114 which is received by its associated receiver 206. Receiver 206 closes a contact similar to contact 196, and if relay 14 has detected a fault in the direction of the protected line 10, a trip coil 208 associated with the remote circuit breaker 22 will be energized, to isolate the fault.

In some protective relaying applications, only forward direction faults will be monitored. If additional security is desired, reverse direction faults may also be monitored, with their detection being used in any desired logic scheme to provide the desired additional security. As illustrated in FIG. 1, the output of latch and driver 158 may be connected to energize another keying coil 210 in transmitter 204, which may control the frequency sent, for example, in an FSK system.

Significant traveling wave surges are only produced on a transmission line when a fault occurs during the presence of line voltage. However, as hereinbefore described, even if the fault occurs at or near a voltage zero, relays 12 and 14 will detect the fault. The fault initiated current and voltage deviations from the normal power frequency waveforms provide an elliptical orbit when plotted on the deviation plane, and by differentiating the current deviation signal, or by integrating the voltage deviation signal, straight line trajectories are produced in the transformed deviation plane, as described relative to the trajectories produced by power frequency deviations which include traveling wave activity. The current and voltage deviations from the power frequency envelopes contain distance-to-the fault information, unlike the traveling wave components. Thus, direct, zone 1 trip decisions may be made using the trajectory concept.

Figure 5:
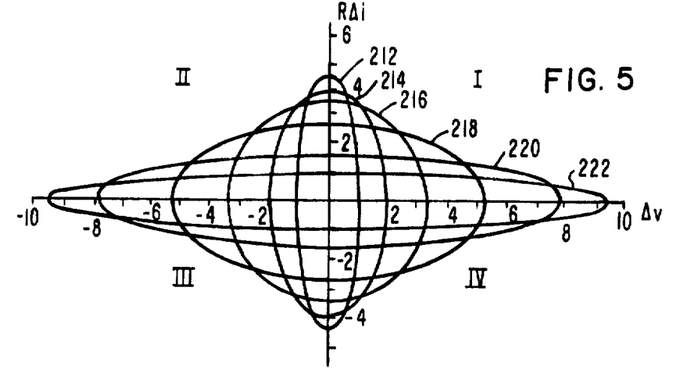
FIG. 5 is a graph of the deviation plane similar to FIG. 3, which illustrates the response of the elliptical trajectory to different source impedances, with a fault inception angle of zero.
Figure 6:
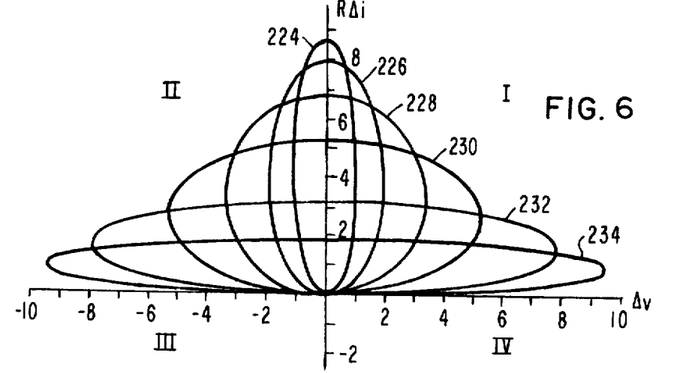
FIG. 6 is a graph similar to FIG. 5, except with a fault inception angle of $\pi/2$.

The prior art elliptical trajectory concept makes it difficult to select the boundary thresholds for making zone 1 trip decisions, however, because of the hereinbefore mentioned dependence of the position of the ellipse, and the shape of the ellipse, on fault inception angle and source impedance. Ideally, only the affect due to the reactance to the fault $X_f$ is desired. FIG. 5 is a graph which illustrates how the elliptical shape of the orbit changes with different source impedances, with a constant line impedance, or impedance to the fault, $X_f$, and a fault initiation angle $\gamma$ of 0 degrees, i.e., no offset from the origin. The elliptical trajectories 212, 214, 216, 218, 220 and 222 represent source per unit inductances of 0.25, 0.5, 10.0, 20.0, 5.0 and 10.0, respectively, assuming the source impedance to be a pure inductance. It can be seen that determining a threshold boudary for constant $X_f$ would be extremely difficult. The boundary selection problem is further complicated because of the elliptical orbits' positional reliance upon fault inception angle. If instead of a fault inception angle of 0 degrees, i.e., no offset, the fault inception angle is $\pi/2$ or 90° i.e., full offset, the positions of the elliptical orbits appear as shown in FIG. 6. Elliptical trajectories 224, 226, 228, 230, 232 and 234 represent per unit source inductances of 0.25, 0.5, 1.0, 2.0, 5.0 and 10.0, respectively. Fault inception angles between 0° and 90° place the elliptical orbits somewhere between their positions shown in FIGS. 5 and 6 for any selected source impedance.

Figure 7:
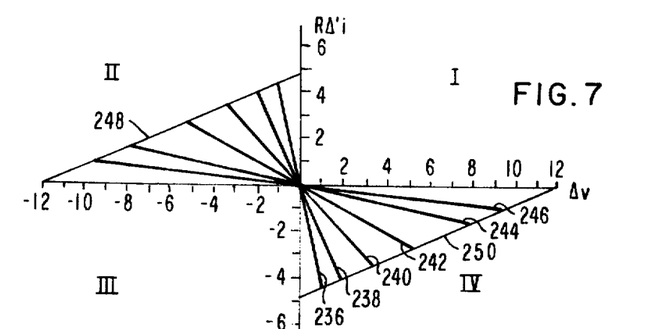
FIG. 7 is a graph of the transformed deviation plane, similar to FIG. 4, illustrating how the slope of the straight line trajectory is determined by source impedance.

In the present invention, the straight line trajectories are independent of fault inception angle, i.e., only the starting point on the straight line trajectory is controlled by the fault inception angle. The source impedance only affects the slope of the straight line trajectory, i.e., slope $= \pm 1/X_S$. FIG. 7 is a graph of the transformed deviation plane with a per unit reactance $X_f$ to the fault of 2.5. Straight lines 236, 238, 240, 242, 244 and 246 represent source inductive per unit reactances of 0.25, 0.5, 1.0, 2.0, 5.0 and 10.0, respectively. Similar straight line trajectories would be developed for reverse direction faults.

In FIG. 7, the reactance of the line to the fault was held constant for each value of $X_S$. The maximum point of each trajectory lies on a straight line 248 in quadrant II, and on a straight line 250 in quadrant IV. These lines correspond to a line of constant line reactance to the fault $X_f$ and thus may be used as a boundary to determine reactance, and thus distance, to the fault. These straight line boundaries 248 and 250 are easily obtained, as the $\Delta'i(t)$ coordinate is equal to: $1/X_f \Delta v(t) \pm E/X_f$, for the forward direction, where E is equal to the source voltage peak. Similar thresholds may be established for the reverse direction, if reverse direction faults are to be detected. Thus, as shown in FIG. 1, the same functions may be used to obtain the intelligence for a zone 1 direct trip decision, as were used to obtain the directional information from the traveling wave, and the functional blocks are thus given the same reference numerals with a prime mark. The only difference between the implementations may be additional filtering in the low-pass filters 26' and 80', which filtering may be the same as now used by prior art distance relays.

The mathematical representations of the present invention for the direct, zone 1 trip are set forth as follows, with the symbols in the equations being:

$\Delta v(t)$—the fault initiated voltage deviation with time, from the pre-fault level $\Delta i(t)$—the fault initiated current deviation with time, from the pre-fault level $\Delta'i(t)$—the time derivative of $\Delta i(t)$ $\Delta V$—the maximum fault initiated voltage deviation $\Delta I$—the maximum fault initiated current deviation $\gamma$—the fault inception angle (0 = maximum voltage, $\pi/2$ = voltage zero)

$X_s$—source impedance—assumed to be pure reactance $X_f$—line impedance—assumed to be pure reactance E—peak source voltage $L_s$—source inductance The voltage and current deviation signals may be written:

$$\Delta v(t) = \Delta V \cos(\omega t + \gamma) \quad (1)$$

$$\Delta i(t) = \Delta I[\sin(\omega t + \gamma) - \sin \gamma] \quad (2)$$

Squaring and adding (1) and (2) provides:

$$\frac{\Delta v(t)^2}{\Delta V^2} + \frac{[\Delta i(t) + \Delta I \sin \gamma]^2}{\Delta I^2} = 1 \quad (3)$$

Equation (3) is the equation of an ellipse displaced along the $\Delta i$ axis of the deviation plane by an amount equal to $\Delta I \sin \gamma$. This is thus the trajectory used in the elliptical orbit concept.

Taking the time derivative of equation (2):

$$\frac{d}{dt}\Delta i(t) = \omega \Delta I \cos(\omega t + \gamma) \quad (4)$$

Dividing (1) by (4):

$$\frac{\Delta v(t)}{\Delta V} = \frac{\Delta' i(t)}{\omega \Delta I} \quad (5)$$

Equation (5) may be broken down into two straight lines on the transformed deviation plane passing through the origin between quadrants dependent upon the relative signs of $\Delta'i$ and $\Delta v$:

$$\Delta' i(t) = \frac{\omega \Delta I}{\Delta V} \Delta v(t) \quad (5a)$$

$$\Delta' i(t) = -\frac{\omega \Delta I}{\Delta V} \Delta v(t) \quad (5b)$$

Equations (5a) and (5b) describe the straight line trajectories 116 and 114 in FIG. 4. $\Delta I$ and $\Delta V$ may also be written:

$$\Delta I = \frac{E}{X_s + X_f} \quad (6a)$$

$$\Delta V = \frac{-X_s E}{X_s + X_f} \quad (6b)$$

Thus, the slope of the straight line trajectories is given as follows:

$$\text{slope } m = \pm \frac{\omega \Delta I}{\Delta V} = \pm \frac{\omega}{X_s} = \pm \frac{1}{L_s} \quad (7)$$

Equation (7) illustrates that the slope of the straight line trajectory is determined by the source inductance, as illustrated graphically in FIG. 7.

The mathematical representation of the present invention for directional determination from traveling waves is set forth as follows, with the additional symbols used being:

a(t)—forward traveling wave, i.e., the reflected or launched incident wave
b(t)—backward traveling wave, i.e., the incident or received wave
$R_w$—surge resistance of the line The forward and backward traveling waves a(t) and b(t) are defined as follows:

$$a(t) = R_w \Delta i(t) + \Delta v(t) \quad (8)$$

$$b(t) = R_w \Delta i(t) - \Delta v(t) \quad (9)$$

The backward traveling wave for a forward direction fault is independent of the terminal condition, and may be initially approximated as:

$$b(t) \approx 2E \cos \gamma \quad (10)$$

This incident wave is reflected at the line terminals and is very dependent upon the line terminal conditions. Assuming the source to be inductance, the deviation signals at the measuring or relaying point may be written:

$$\Delta v(t) = -L_s \frac{d \Delta i(t)}{dt} \quad (11)$$

From equation (8), (9) and (10):

$$\Delta i(t) = \frac{a(t) + 2E \cos \gamma}{2 R_w} \quad (12)$$

Therefore:

$$\frac{d \Delta i(t)}{dt} = \frac{1}{2 R_w} \frac{da(t)}{dt} \quad (13)$$

Substituting equations (11), (12) and (13) into (1) and (2):

$$a(t) = 2E \cos \gamma - \frac{L_s}{R_w} \frac{da(t)}{dt} \quad (14)$$

In the Laplace domain, differential equation (14) may be solved using the initial conditions a (o+) = −2E cos γ:

$$A(s) = L\{a(t)\} = 2E \cos \gamma \left[ \frac{1}{s} - \frac{L_s}{R_w} \right] \left[ \frac{1}{1 + s\left(\frac{L_s}{R_w}\right)} \right] \quad (15)$$

Therefore:

$$a(t) = L^{-1}\{A(s)\} = 2E \cos \gamma \left[ 1 - 2e^{-\frac{t}{T}} \right] \quad (16)$$

where:

$$T = \frac{L_s}{R_w} \text{ (time constant of the line)}$$

This response is delayed by the travel time τ from the fault to the relaying point. This is equivalent to replacing t with Δt = t − τ in equation (16) for a(t). The equations are valid over the range: τ < t < 3τ. If we assume $L_s$ is connected at the relaying point, we may now define the two waves over the specified interval as:

$$a(t) = 2E \cos \gamma \left( 1 - 2e^{-\frac{\Delta t}{T}} \right) \quad (17)$$

$$b(t) = 2E \cos \gamma \quad (18)$$

Substituting (17) and (18) into (8) and (9):

$$\Delta v(t) = -2E \cos \gamma \, e^{-\frac{\Delta t}{T}} \quad (19)$$

$$\Delta i(t) = \frac{2E}{R_w} \cos \gamma \left[ 1 - e^{-\frac{\Delta t}{T}} \right] \quad (20)$$

On the deviation plane, equations (19) and (20) form a straight line trajectory as given by equation:

$$R_w \Delta i(t) = \Delta v(t) + 2E \cos \gamma \quad (21)$$

where $$\tau < t < 3\tau$$

To apply equation (21) to the transformed deviation plane of the invention, the derivative of equation (20) is found:

$$R_w \Delta' i(t) = 2e \cos \gamma \left( \frac{1}{T} \right) e^{-\frac{\Delta t}{T}} \quad (22)$$

$$= -\frac{R_w}{L_s} \Delta v(t) \quad (23)$$

Therefore:

$$\Delta' i(t) = -\frac{1}{L_s} \Delta v(t) \quad (24)$$

Thus, equation (24) corresponds to a straight line through the origin of the transformed deviation plane having a slope of $1/L_s$. If this procedure were to be repeated for a fault in the reverse direction, the trajectory would be the same as equation (24) except that the slope $1/L_s$ would be of opposite sign. These straight-line trajectories are exactly as obtained in equations (5), (5a) and (5b) of the quasi-stationary, i.e., power frequency, example (without significant traveling wave surges).

If instead of differentiating equation (2), the integral of equation (1) is taken, the result is the same as integrating both sides of equations (52) and (56).

If instead of differentiating equation (20), equation (19) is integrated, an equation similar to equation (24) results, with the only differences being that $\Delta i(t)$ is substituted for $\Delta' i(t)$, and $\overline{\Delta v}(t)$ is substituted for $\Delta v(t)$. The symbol $\overline{\Delta v}(t)$ indicates the time integral of $\Delta v(t)$.

In summary, when a fault occurs on a power system, high frequency traveling wave components are superposed on an underlying 60 Hz. post fault component. By proper filtering, the disclosed transformed deviation plane may be used to produce straight line trajectories which indicate both the distance and direction to a fault. Thus, a protective relay may be constructed which will make zone 1 trip decisions, with the protected zone being substantially longer than possible when using the prior art elliptical trajectory concept. Further, the same signals used to provide direction information may be used with less filtering than used for the distance and direction determination, as the deviation signals which include both the power frequency component and traveling wave component produce the same straight lines on the transformed deviation plane. This enables fault direction to be quickly and accurately detected. Thus, a relay may be constructed according to the teachings of the invention for use in a directional comparison arrangement. The traveling wave transients cause the relay to overreach its intended zone of protection, and thus a relay constructed to operate with the traveling wave transients present in the signals is not used to provide a distance-to-the-fault determination.

Since both the power frequency and traveling wave transient components will be present in the signals for any given fault, except when a fault occurs at a voltage 0, then a trade-off must occur. The prior art technique which plots the voltage and current deviations has certain disadvantages. The 60 Hz. elliptical response varies with fault inception angle and source inductance such that setting a threshold of constant fault reactance for all faults is not possible. Because of this, the threshold must be set for the "worst case" fault. To add to this compromise, the traveling wave component of response, which is not elliptical, causes an overreaching effect.

In order to apply a zone 1 or direct trip scheme using the prior art technique, it would be necessary to set the zone 1 relay to protect only a small fraction of the line. This is to ensure that the relay will not operate for faults beyond the remote end of the line. The reach of this zone may be increased by reducing the overreaching effect of the traveling waves through filtering, but filtering may cause incorrect operation for some faults.

Since the reach of zone 1 at each end of the line would be short, when using the prior art technique, a large portion of the line would have to be protected by the directional comparison method. In this mode, the same two signal components would be present, but the thresholds are placed very close to the origin. If sufficient traveling wave activity is present, the appropriate threshold will be crossed almost instantaneously. If there is no traveling wave activity, the threshold will still be crossed very quickly because of the underlying 60 Hz. response. It should be pointed out that, while detection using this method is very quick, the system requires a channel delay time in order to communicate with the remote relay. In order to obtain high speed, a costly channel having a wide bandwidth is required, and if the channel fails, the scheme provides very little protection.

An important aspect of the disclosed invention is the fact that using just the 60 Hz. component, the reach of a relay may be set accurately, as there is no dependence upon fault inception angle or source inductance. The overreaching effect due to traveling waves may be reduced by filtering without causing misoperation, since only one type of threshold boundary is crossed by any trajectory. These advantages allow the reach of the relay to be set for a much larger portion of the line which it is protecting, than would be possible when using the prior art technique. The response of such a relay may be somewhat slower because of the filtering, but it would still be faster than one which incorporates a substantially long channel delay time in a directional comparison arrangement.

Thus, both the directional comparison and zone 1 aspects are based on the same principles, both operate for all fault inception angles, and both schemes generate straight line trajectories on the transformed deviation plane of the invention.

I claim as my invention:

1. A method of determining the direction to a fault from a measuring point on an A.C. electrical power transmission line, comprising the steps of:
   providing a current derived signal which is a function of the fault generated current deviation from the steady pre-fault current as a function of time,
   providing a voltage derived signal which is a function of the fault generated voltage deviation from the steady pre-fault voltage as a function of time,
   transforming at least one of said signals such that the transformation results in the order of differentiation of the current derived signal being one order higher than the voltage derived signal, with the different order voltage and current derived signals being referred to as first and second signals, respectively,
   and processing said first and second signals to provide an indication of the direction of the fault relative to the measuring point.

2. The method of claim 1 wherein the processing step includes the step of determining if a trajectory generated by using the first and second signals as coordinates on a plane rectangular cartesian coordinate arrangement crosses a predetermined threshold boundary having a predetermined slope and axis intercept in at least a predetermined one of the quadrants.

3. The method of claim 1 wherein the processing step includes the step of determining if a trajectory generated by using the first and second signals as coordinates on a plane, rectangular cartesion coordinate arrangement crosses first and second threshold boundaries in the second and fourth quadrants, respectively.

4. The method of claim 1 wherein the processing step includes the steps of generating a trajectory using the first and second signals as coordinates, establishing threshold boundaries in at least second and fourth quadrants, and detecting the crossing of a threshold boundary by the trajectory.

5. The method of claim 4 wherein the step of establishing threshold boundaries establishes them in all four quadrants, and the detecting step detects the crossing of any boundary and indicates the associated quadrant, with the crossing of a boundary in the second or fourth quadrants indicating a fault in a first direction from the measuring point, and the crossing of a boundary in the first or third quadrants indicating a fault in the opposite direction.

6. The method of claim 1 wherein the processing step includes the steps of providing a threshold signal having a magnitude which varies as a function of the first signal, and comparing the second signal with the threshold signal.

7. The method of claim 1 wherein the processing step includes the steps of providing first and second threshold signals having magnitudes which vary as a function of the first signal, with the first threshold signal providing a reference level effective when the second and first signals have positive and negative polarities, respectively, and with the second threshold signal providing a reference level effective when the second and first signals have negative and positive polarities, respectively, and comparing the second signal with the first and second threshold signals.

8. The method of claim 7 including the steps of providing third and fourth threshold signals having magnitudes which vary as a function of the first signal, with the third threshold signal providing a reference level effective when the second and first signals both have positive polarities, and with the fourth threshold signal providing a reference level effective when the second and first signals both have negative polarities, comparing the second signal with the third and fourth threshold signals, detecting when the second signal reaches the level of a threshold signal, and indicating the associated quadrant, with the second or fourth quadrants indicating a fault in a first predetermined direction, and with the first or third quadrants indicating a fault in the opposite direction.

9. The method of claim 1 wherein the processing step includes the steps of establishing at least one boundary threshold having a predetermined slope and axis intercept on a plane coordinate arrangement wherein the second signal is associated with one coordinate axis and the first signal is associated with the other, providing a threshold signal which varies as a function of the coordinate value required for the second signal to describe a point at the intersection of a coordinate responsive to the instantaneous value of the first signal and the boundary threshold, and comparing the second signal with the threshold signal.

10. The method of claim 1 wherein the processing step includes the steps of establishing first, second, third and fourth boundary thresholds having predetermined slopes and axis intercepts in the first, second, third and fourth quadrants, respectively, of a plane coordinate arrangement wherein the second signal is associated with one coordinate axis and the first signal is associated with the other, providing first, second, third and fourth threshold signals as a function of the first signal and the first, second, third and fourth boundary thresholds, comparing the second signal with the first, second, third and fourth threshold signals, with the exceeding of the second or fourth threshold signals by the second signal indicating a fault in a first direction from the measuring point, and the exceeding of the first or third threshold signals indicating a fault in the opposite direction.

11. The method of claim 1 wherein the transforming step includes the step of differentiating the current derived signal.

12. The method of claim 1 wherein the transforming step includes the step of integrating the voltage derived signal.

13. A method of determining the direction to a fault from a measuring point on an A.C. electrical power transmission line, and for determining if the fault is within a predetermined distance from the measuring point, comprising the steps of:
providing a current derived signal which is a function of the fault generated current deviation from the steady pre-fault current as a function of time,
providing a voltage derived signal which is a function of the fault generated voltage deviation from the steady pre-fault voltage as a function of time,
filtering the current and voltage derived signals to remove transients due to traveling wave activity,
transforming at least one of said signals such that the transformation results in the order of differentiation of the current derived signal being one order higher than the voltage derived signal, with the different order voltage and current derived signals being referred to as first and second signals, respectively,
and processing said first and second signals to provide an indication of the direction and distance of the fault from the measuring point.

14. The method of claim 13 wherein the processing step includes the step of determining if a trajectory generated by using the first and second signals as coordinates crosses a predetermined threshold boundary having a predetermined slope and axis intercept in at least a predetermined one of the associated quadrants.

15. The method of claim 13 wherein the processing step includes the step of determining if a trajectory generated by using the first and second signals as coordinates crosses first or second threshold boundaries in the second and fourth quadrants, respectively.

16. The method of claim 13 wherein the processing step includes the steps of generating a trajectory using the first and second signals as X and Y coordinates, respectively, establishing threshold boundaries in at least the second and fourth quadrants, and detecting the crossing of a threshold boundary by the trajectory.

17. The method of claim 13 wherein the transforming step includes the step of differentiating the current derived signal.

18. The method of claim 13 wherein the transforming step includes the step of integrating the voltage derived signal.

19. A method of determining the direction to a fault from a measuring point on an A.C. electrical power transmission line from fault initiated traveling waves, and both the distance and direction when the traveling wave surges are filtered, comprising the steps of:
providing a first signal which is a function of the fault generated traveling wave current deviation from the steady pre-fault current as a function of time,
differentiating the first signal to provide a second signal,
providing a third signal which is a function of the fault generated traveling wave voltage deviation from the steady pre-fault voltage as a function of time,
processing said second and third signals to provide an indication of the direction of the fault relative to the measuring point,
filtering the first signal to provide a fourth signal which is a function of the fault generated current deviation from the steady pre-fault current as a function of time with transients due to traveling wave activity removed, differentiating the fourth signal to provide a fifth signal, filtering the third signal to provide a sixth signal which is a function of the fault generated voltage deviation from the steady pre-fault voltage as a function of time with transients due to traveling wave activity removed, and processing said fifth and sixth signals to provide an indication of the direction and distance of the fault from the measuring point.

20. A directional relay for determining the direction to a fault from a measuring point on an A.C. electrical power transmission line, comprising:

first means for providing a current derived signal which is a function of the fault generated current deviation from the steady pre-fault current as a function of time, second means for providing a voltage derived signal which is a function of the fault generated voltage deviation from the steady pre-fault voltage as a function of time, third means for transforming at least one of said signals such that the transformation results in the order of differentiation of the current derived signal being one order higher than the voltage derived signal, with the different order voltage and current derived signals being referred to as first and second signals, respectively, and fourth means for processing said first and second signals to provide an indication of the direction of the fault relative to the measuring point.

21. The directional relay of claim 20 wherein the fourth means includes means for generating a trajectory by using the first and second signals as coordinates, means providing a predetermined threshold boundary having a predetermined slope and axis intercept in at least a predetermined one of the quadrants, and threshold monitoring means for detecting the crossing of the threshold boundary by the trajectory.

22. The directional relay of claim 20 wherein the fourth means includes means generating a trajectory using the first and second signals as X and Y coordinates, respectively, means providing first and second threshold boundaries in the second and fourth quadrants, respectively, and threshold monitoring means for detecting the crossing of a threshold boundary by the trajectory.

23. The directional relay of claim 20 wherein the fourth means includes means generating a trajectory using the first and second signals as X and Y coordinates, respectively, means for establishing threshold boundaries in at least the second and fourth quadrants, and means detecting the crossing of a threshold boundary by the trajectory.

24. The directional relay of claim 23 wherein the means for establishing threshold boundaries establishes a threshold boundary in each of the four quadrants, and the means for detecting the crossing of a threshold boundary detects the crossing of any boundary and indicates the associated quadrant, with the crossing of a boundary in the second or fourth quadrants indicating a fault in a first direction from the measuring point, and the crossing of a boundary in the first or third quadrants indicating a fault in the opposite direction.

25. The directional relay of claim 20 wherein the fourth means includes means for providing a threshold signal having a magnitude which varies as a function of the first signal, and means for comparing the second signal with the threshold signal.

26. The directional relay of claim 20 wherein the fourth means includes means for providing first and second threshold signals having magnitudes which vary as a function of the first signal, with the first threshold signal providing a reference level effective when the second and first signals have positive and negative polarities, respectively, and with the second threshold signal providing a reference level effective when the second and first signals have negative and positive polarities, respectively, and means for comparing the second signal with the first and second threshold signals.

27. The directional relay of claim 26 including means for providing third and fourth threshold signals having magnitudes which vary as a function of the first signal, with the third threshold signal providing a reference level effective when the second and first signals both have positive polarities, and with the fourth threshold signal providing a reference level effective when the second and first signals both have negative polarities, means for comparing the second signal with the third and fourth threshold signals, and means for detecting when the second signal reaches the magnitude of a threshold signal, and for indicating the associated quadrant, with the second or fourth quadrants indicating a fault in a first predetermined direction, and with the first or third quadrants indicating a fault in the opposite direction.

28. The directional relay of claim 20 wherein the fourth means includes means for establishing at least one boundary threshold having a predetermined slope and axis intercept on a plane coordinate arrangement wherein the second signal is associated with one coordinate axis and the first signal is associated with the other, means for providing a threshold signal which varies as a function of the coordinate value for the second signal which describes a point at the intersection of a coordinate responsive to the instantaneous value of the first signal and the boundary threshold, and means for comparing the second signal with the threshold signal.

29. The directional relay of claim 20 wherein the fourth means includes means for establishing first, second, third and fourth boundary thresholds having predetermined slopes and axis intercepts in the first, second, third and fourth quadrants, respectively, of a plane coordinate arrangement wherein the second signal is associated with the y axis and the first signal is associated with the x axis, means for providing first, second, third and fourth threshold signals as a function of the first signal and the first, second, third and fourth boundary thresholds, and means for comparing the second signal with the first, second, third and fourth threshold signals, wherein the exceeding of the second or fourth threshold signals by the second signal indicates a fault in a first direction from the measuring point, and the exceeding of the first or third threshold signals indicating a fault in the opposite direction.

30. The directional relay of claim 20 wherein the third means includes means for differentiating the current derived signal.

31. The directional relay of claim 20 wherein the third means includes means for integrating the voltage derived signal.

32. A protective relay for determining the direction to a fault from a measuring point on an A.C. electrical power transmission line, and for determining if the fault is within a predetermined distance from the measuring point, comprising:

first means for providing a current derived signal which is a function of the fault generated current deviation from the steady pre-fault current as a function of time, second means for providing a voltage derived signal which is a function of the fault generated voltage deviation from the steady pre-fault voltage as a function of time, filter means for removing transients due to traveling wave activity from each of said current and voltage derived signals, third means for transforming at least one of said filtered signals such that the transformation results in the order of differentiation of the current derived signal being one order higher than the voltage derived signal, with the different order voltage and current derived signals being referred to as first and second signals, respectively, and fourth means for processing said first and second signals to provide an indication of the direction and distance of the fault from the measuring point.

33. The protective relay of claim 32 wherein the fourth means includes means for generating a trajectory by using the first and second signals as coordinates on a plane coordinate arrangement, and means for providing a first predetermined threshold boundary having a predetermined slope and axis intercept in at least a predetermined one of the quadrants.

34. The protective relay of claim 32 wherein the fourth means includes means for generating a trajectory using the first and second signals as coordinates on a plane coordinate arrangement, means for providing first and second threshold boundaries in the second and fourth quadrants, and means for threshold monitoring the first and second threshold boundaries.

35. The protective relay of claim 32 wherein the fourth means includes means for generating a trajectory using the first and second signals as x and y coordinates, respectively, means for establishing threshold boundaries in at least the second and fourth quadrants, and means for detecting the crossing of a threshold boundary by the trajectory.

36. A protective relay apparatus for determining the direction to a fault from a measuring point on an A.C. electrical power transmission line from signals which include fault initiated traveling waves, and both the direction and distance when the traveling wave surges are filtered from the signals, comprising:

means for providing a first current derived signal which is a function of the fault generated traveling wave current deviation from the steady pre-fault current as a function of time, means for providing a first voltage derived signal which is a function of the fault generated traveling wave voltage deviation from the steady pre-fault voltage as a function of time, means for transforming at least one of said first voltage and said current derived signals such that the transformation results in the order of differentiation of the current derived signal being one order higher than the voltage derived signal, with the different order voltage and current derived signals being referred to as first and second signals, respectively, means for processing said first and second signals to provide an indication of the direction of the fault relative to the measuring point, means for providing a second current derived signal which is a function of the fault generated current deviation from the steady pre-fault current as a function of time, with said means including filter means for removing transients due to traveling wave activity, means for providing a second voltage derived signal which is a function of the fault generated voltage deviation from the steady pre-fault voltage as a function of time, with said means including filter means for removing transients due to traveling wave activity, means for transforming at least one of said second voltage and second current derived signals such that the transformation results in the order of differentiation of the current derived signals being one order higher than the voltage derived signal, with the different order voltage and current derived signals being referred to as third and fourth signals, respectively, and means for processing said third and fourth signals to provide an indication of the direction and distance of the fault from the measuring point.

* * * * *